United States Patent
Osakabe et al.

(10) Patent No.: US 7,855,814 B2
(45) Date of Patent: Dec. 21, 2010

(54) SCANNER AND HINGE

(75) Inventors: Yoshinori Osakabe, Seto (JP); Akihiro Sakakibara, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 892 days.

(21) Appl. No.: 11/679,467

(22) Filed: Feb. 27, 2007

(65) Prior Publication Data

US 2007/0201109 A1    Aug. 30, 2007

(30) Foreign Application Priority Data

Feb. 27, 2006    (JP) .............................. 2006-050370

(51) Int. Cl.
*H04N 1/04*    (2006.01)
(52) U.S. Cl. ........................ 358/474; 358/496; 358/497; 358/498
(58) Field of Classification Search ................. 358/474, 358/496, 497, 498
See application file for complete search history.

(56) References Cited

U.S. PATENT DOCUMENTS

| | | | |
|---|---|---|---|
| 6,244,553 | B1 | 6/2001 | Wang |
| 7,133,626 | B2 | 11/2006 | Kaiga et al. |
| 7,440,712 | B2 | 10/2008 | Uchida |
| 2005/0088493 | A1 | 4/2005 | Koga |
| 2005/0207810 | A1 | 9/2005 | Fukumura |
| 2005/0242485 | A1 | 11/2005 | Shiohara et al. |
| 2005/0246862 | A1 | 11/2005 | Chen |
| 2006/0158702 | A1 | 7/2006 | Kondo |
| 2007/0201109 | A1 | 8/2007 | Osakabe et al. |
| 2007/0201111 | A1 | 8/2007 | Osakabe et al. |

FOREIGN PATENT DOCUMENTS

| | | |
|---|---|---|
| CN | 256788 Y | 8/2003 |
| JP | H03-020810 A | 1/1991 |
| JP | H05-047805 A | 2/1993 |

(Continued)

OTHER PUBLICATIONS

Japan Patent Office, Notification of Reasons for Rejection in Japanese Patent Application No. 2006-050370 (counterpart to the above-captioned U.S. Patent Application) mailed Jan. 27, 2009.

(Continued)

*Primary Examiner*—Houshang Safaipour
(74) *Attorney, Agent, or Firm*—Baker Botts L.L.P.

(57) ABSTRACT

A scanner is provided with a device main body, a hinge, a cover member, and a scanning device. The device main body comprises a transparent plate. The transparent plate forms a top surface of the device main body. The hinge is coupled to the device main body. The cover member is coupled to the hinge. The cover member is capable of rotating with respect to the device main body. The cover member is capable of covering the transparent plate. The cover member comprises an auto document feeder. The scanning device is located below the transparent plate. The scanning device is capable of scanning a document put on the transparent plate or a document fed by the auto document feeder. The hinge comprises a wiring support portion that supports a wiring extending between the auto document feeder and the device main body.

13 Claims, 9 Drawing Sheets

FOREIGN PATENT DOCUMENTS

| | | |
|---|---|---|
| JP | H05-047806 A | 2/1993 |
| JP | H06-053368 A | 2/1994 |
| JP | 2991986 B2 | 8/1998 |
| JP | H10-282593 A | 10/1998 |
| JP | 2001-154289 A | 6/2001 |
| JP | 2001-343791 A | 12/2001 |
| JP | 2002-303943 A | 10/2002 |
| JP | 2003-172977 A | 6/2003 |
| JP | 2004-271781 A | 9/2004 |
| JP | 2005-101942 A | 4/2005 |
| JP | 2005-125533 A | 5/2005 |
| JP | 2005-269448 A | 9/2005 |
| JP | 2005-269450 A | 9/2005 |
| JP | 2005258025 A | 9/2005 |
| JP | 2005300796 A | 10/2005 |
| JP | 2006-089263 A | 4/2006 |
| JP | 2007-088996 A | 4/2007 |
| JP | 2007-228528 A | 9/2007 |

OTHER PUBLICATIONS

Chinese Office Action issued in corresponding Chinese Application No. 200710084818.6, dated Jun. 6, 2008.

Chinese Office Action issued in corresponding Chinese Application No. 2007100848171, dated Jul. 4, 2008.

Japan Patent Office; Notification of Reasons for Rejection in Japanese Patent Application No. 2009-160184 (counterpart to the above-captioned U.S. patent application) mailed Sep. 29, 2009.

SCANNER AND HINGE

CROSS-REFERENCE TO RELATED APPLICATION

This application claims priority to Japanese Patent Application No. 2006-050370, filed on Feb. 27, 2006, the contents of which are hereby incorporated by reference into the present application.

BACKGROUND OF THE INVENTION

1. Field of the Invention

The present invention is related to a scanner provided with a cover member that has an auto document feeder. Further, the present invention is related to a hinge used in the scanner.

2. Description of the Related Art

Scanners are widely known. For example, scanners are embedded within copiers, fax devices, multi-function devices, etc. Scanners use an image sensor to scan a document put on a document glass. The document glass is covered by a cover member. The document can thus be prevented from shifting in position on the document glass, and light can be prevented from entering the document glass.

Scanners provided with an auto document feeder within the cover member are known. The auto document feeder transports the document placed on the cover member. The image sensor scans the document fed by the auto document feeder. The auto document feeder is provided with wiring for supplying electric power and control signals. The wiring extends from a device main body of the scanner to the auto document feeder. Japanese Patent Application Publication No. 2005-300796 teaches an example of the aforementioned wiring. In the art set forth therein, the wiring extends from a rear side of a device main body to the exterior, and the wiring extends from a rear side of the cover member to the interior of the cover member. In this technique, a covering body is fixed to the device main body. The covering body covers the wiring extending from the device main body to the exterior.

BRIEF SUMMARY OF THE INVENTION

In the configuration of the aforementioned document, the covering body that covers the wiring is required. In this case, this increases the number of parts required to form the scanner. The present specification teaches a technique wherein the wiring can be supported without increasing the number of parts.

The scanner taught in the present specification comprises a device main body, a hinge, a cover member, and a scanning device. The device main body comprises a transparent plate. The transparent plate forms a top surface of the device main body. The hinge is coupled to the device main body. The cover member is coupled to the hinge. The cover member is capable of rotating with respect to the device main body, and is capable of covering the transparent plate. The cover member comprises an auto document feeder. The scanning device is located below the transparent plate. The scanning device is capable of scanning a document put on the transparent plate or a document fed by the auto document feeder. The hinge comprises a wiring support portion that supports a wiring extending between the auto document feeder and the device main body.

With this configuration, the wiring extending between the auto document feeder and the device main body can be supported without increasing the number of parts.

DETAILED DESCRIPTION OF THE INVENTION

Figure 1:
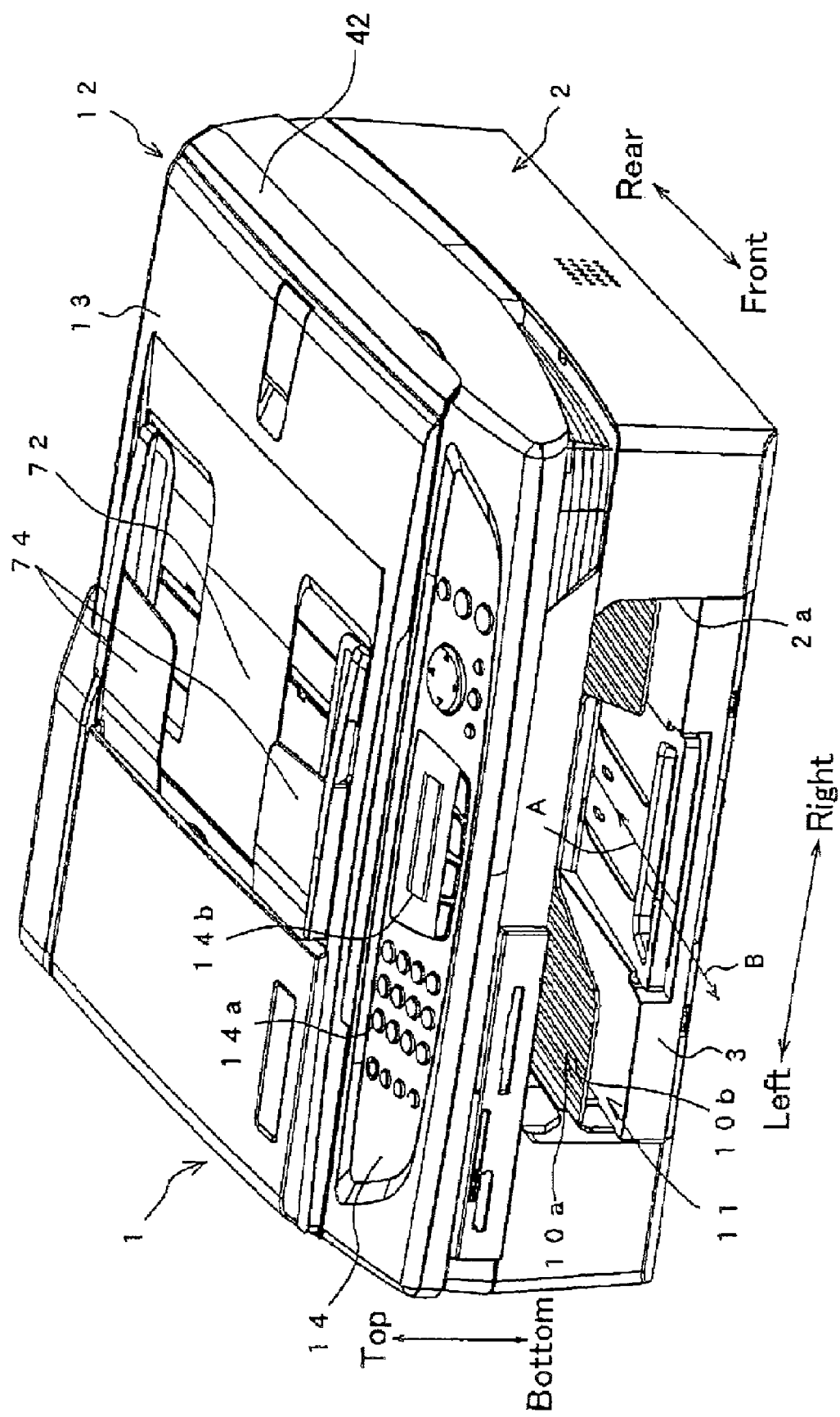
FIG. 1 shows a perspective view of a multi-function device.

First, some characteristics of the technique taught in the present specification will be given.

A cover member may move in a vertical direction with respect to a device main body. With this configuration, a large space can be maintained between a transparent plate and the cover member. A thick document such as a book can be placed upon the transparent plate. Since wiring that extends between an auto document feeder and the device main body is supported by a hinge, it is possible to prevent the wiring from being gripped between the transparent plate and the cover member.

Either of the following configurations may be adopted for moving the cover member in the vertical direction with respect to the device main body.

(1) The hinge may be capable of sliding in the vertical direction with respect to the device main body. In the case where the hinge slides in the vertical direction with respect to the device main body, the cover member may move in the vertical direction with respect to the device main body. That is, the hinge and the cover member may move integrally in the vertical direction.

(2) The cover member may be capable of sliding in the vertical direction with respect to the hinge. In this case, only the cover member moves in the vertical direction, and the hinge does not move in the vertical direction.

The device main body may comprise a hole extending in the vertical direction. A part of the hinge may be located within the hole. The hinge may be capable of sliding in the vertical direction along the hole. With this configuration, the hinge can slide in the vertical direction with respect to the device main body.

A part of the wiring support portion of the hinge may be located within the hole. Alternatively, the wiring support portion of the hinge may not be located within the hole.

The wiring support portion of the hinge supports a part of the wiring This part may extend in the vertical direction. Alternatively, the part supported by the wiring support portion (the part of the wiring) may extend in a different direction.

Either of the following configurations may be adopted in order to rotate the cover member with respect to the device main body.

(1) The cover member may comprise a shaft extending in a horizontal direction. The hinge may comprise a shaft support portion that supports the shaft. The cover member may be capable of rotating with the shaft as a center.

(2) The hinge may have a configuration capable of bending.

The wiring may be located across a rotational central line of the cover member. With this configuration, it is possible to effectively prevent the wiring from sagging and straining when the cover member rotates.

The device main body may comprise a main body side support portion that supports the wiring. When this configuration is adopted, it is possible to effectively prevent the wiring from sagging.

The part of the wiring supported by the wiring support portion of the hinge, as described above, may extend in the vertical direction. In this case, the part of the wiring supported by the main body side support portion may extend in a horizontal direction.

Embodiment

Figure 2:
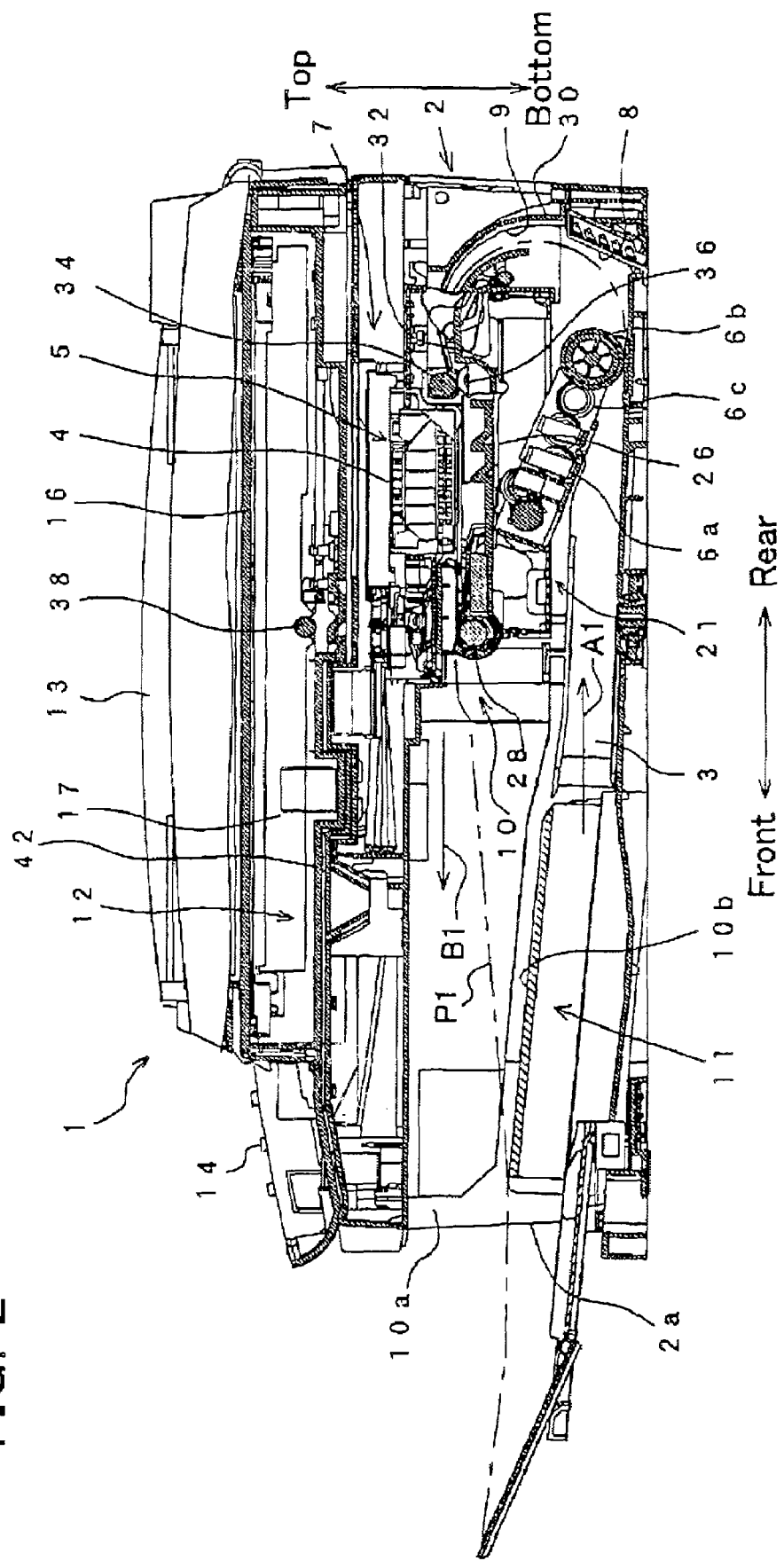
FIG. 2 shows a longitudinal cross-sectional view of the multi-function device.

An embodiment of the present invention will be described with reference to the figures. FIG. 1 shows a perspective view of a multi-function device 1. FIG. 2 shows a cross-sectional view of the multi-function device 1. The vertical direction of the multi-function device 1 is determined to be the standard for a state of normal use (the state in FIG. 1). Further, the front-rear direction of the multi-function device 1 will be described considering a side at which an operation panel portion 14 (to be described) is located to be a front side. The left-right direction of the multi-function device 1 is determined using as the standard the case where the multi-function device 1 is viewed from the front side.

The multi-function device 1 has a printer function, scanner function, color copier function, fax function, etc. The multi-function device 1 has a synthetic resin housing 2 and a scanner 12. The scanner 12 is disposed at an upper part of the housing 2. The scanner 12 is used for reading documents.

The scanner 12 is attached to the housing 2 of the multi-function device 1. The scanner 12 comprises a device main body 42 and a document cover 13. The document cover 13 is capable of covering a top surface of the device main body 42. The document cover 13 is capable of rotating with respect to the device main body 42 with a rear end of the document cover 13 as a center of rotation.

Figure 4:
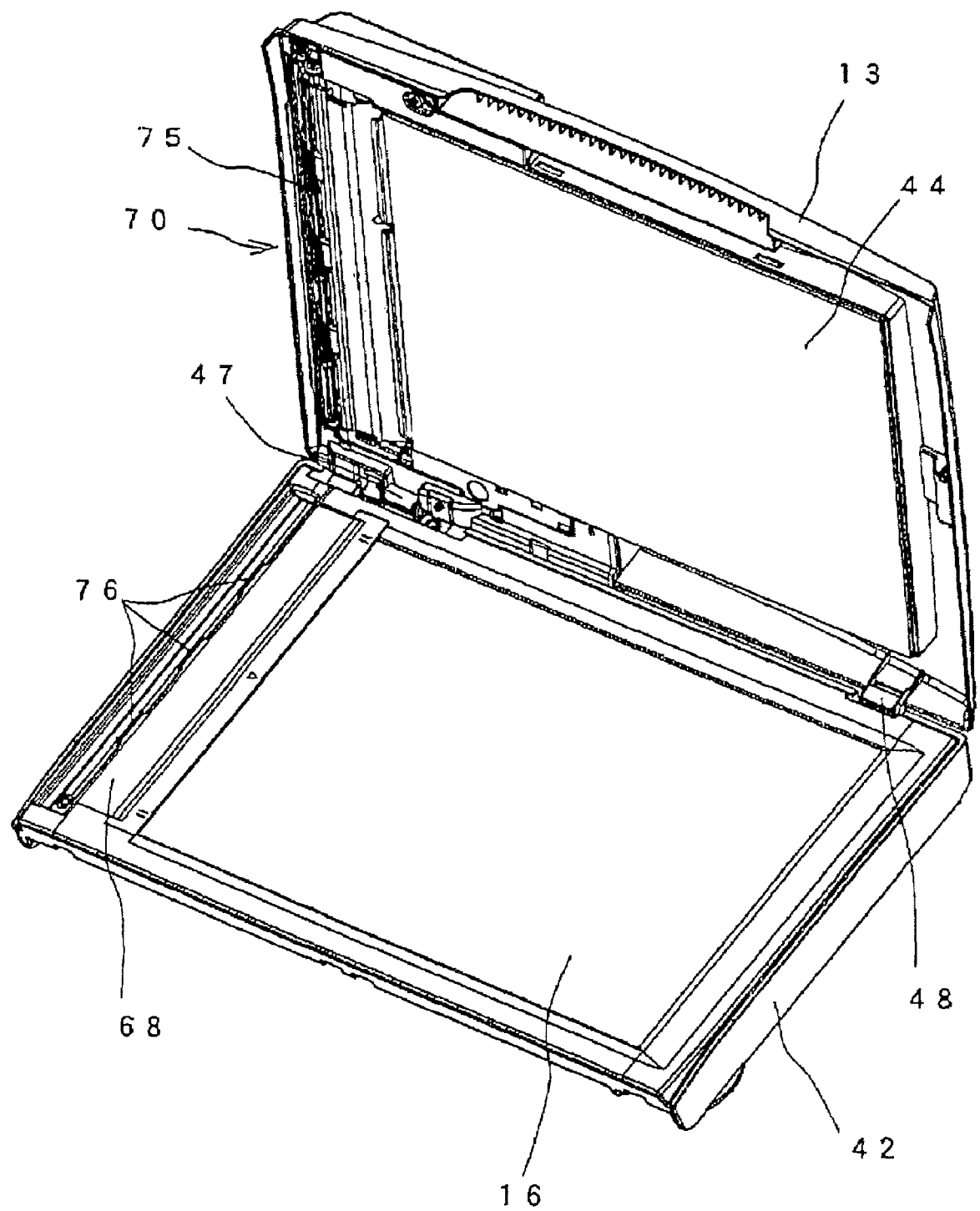
FIG. 4 shows a perspective view of the scanner in a stare where a document cover is open.

As shown in FIG. 2, the device main body 42 comprises a first document glass 16. As shown in FIG. 4, the device main body 42 also comprises a second document glass 68. The first document glass 16 and the second document glass 68 are disposed at the same height, and form the top surface of the device main body 42. The scanner 12 has a contact image sensor (CIS) 17. The CIS 17 is disposed below the first document glass 16 and the second document glass 68. The CIS 17 is capable of moving along a guide shaft 38 that extends in a direction orthogonal to the plane of the page of FIG. 2 (a sub-scanning direction).

The operation panel portion 14 is formed to the front of the scanner 12. The operation panel portion 14 comprises operation buttons 14a for performing input operations, and a liquid crystal display (LCD) 14b for displaying information.

As shown clearly in FIG. 2, a feeder portion 11 for feeding printing paper P1 is formed at a bottom part of the housing 2. The feeder portion 11 has a feeder cassette 3 for housing a plurality of sheets of the printing paper P1 in a stacked state. The feeder cassette 3 can be attached to and removed from the housing 2. An opening 2a is formed in a front surface of the housing 2. The feeder cassette 3 can be pushed into and pulled out from this opening 2a. The feeder cassette 3 is capable of housing printing paper P1 in the sizes: A4, letter, legal, post-card, etc. When the printing paper P1 is in a housed state within the feeder cassette 3, short ends (the width) of the printing paper P1 extend in a direction (a left-right direction) orthogonal to a feeding direction (a front-rear direction, the direction of the arrow A1).

An oblique separating plate 8 is disposed in a rear end part of the feeder cassette 3. The oblique separating plate 8 is shaped so as to protrude toward the front at a central part in the widthwise direction (the left-right direction) of the printing paper P1. A saw-tooth shaped resilient separating pad is formed at the central part in the widthwise direction of the printing paper P1. The oblique separating plate 8 separates the printing paper P1 so that only one of the plurality of sheets of printing paper P1 will be transported.

One end of a feeding arm 6a is coupled with the housing 2. The feeding arm 6a is capable of swinging upward and downward. A feeding roller 6b is formed at the other end of the feeding arm 6a. The feeding arm 6a has a gear transmission structure 6c. Rotating driving force from a transportation motor (not shown) is transmitted to the feeding roller 6b via the gear transmission structure 6c. The feeding roller 6b makes contact with the uppermost sheet of the printing paper P1 housed in the feeder cassette 3. The feeding roller 6b transports the uppermost sheet of the printing paper P1 in the direction of the arrow A1.

The printing paper P1 that has been transported in the direction of the arrow A1 passes along a transporting path 9 formed between a first transporting path member 30 and a second transporting path member 32. The transporting path 9 has a U-shape that faces toward a horizontal direction. The printing paper P1 that has passed through the transporting path 9 is sent to a recording portion 7 disposed above the feeder cassette 3.

The recording portion 7 comprises a main frame 21, a recording head 4, and a carriage 5. The main frame 21 has a box shape that is open at an upper surface. The recording head 4 is an ink jet type. The recording head 4 prints an image onto the printing paper P1 by discharging ink from a bottom surface thereof. The carriage 5 supports the recording head 4. A platen 26 is fixed to the main frame 21. The platen 26 is disposed below the recording head 4. The platen 26 has a flat shape that extends in the left-right direction. The platen 26 supports the printing paper P1 from below so that the printing paper P1 faces the recording head 4.

A driving roller 34 and a nip roller 36 are disposed to the right of the platen 26. The driving roller 34 is a transporting (resist) roller for transporting the printing paper P1 toward a top surface of the platen 26 (the bottom surface of the recording head 4). The nip roller 36 is disposed below the driving roller 34, and faces this driving roller 34. Further, a paper discharging roller 28 and a spur roller (not shown) are disposed to the left of the platen 26. The paper discharging roller 28 transports the printing paper P1 that has been printed by the recording portion 7 in the direction of the arrow B1. The spur roller faces the paper discharging roller 28. The spur roller pushes toward the paper discharging roller 28. The printing paper P1 is transported to a paper discharge portion 10 by the paper discharging roller 28 and the spur roller.

The paper discharge portion 10 is disposed above the feeder portion 11. The printing paper P1 that has been printed by the recording portion 7 is ejected to the paper discharge portion 10 with a printed face thereof facing upward. The paper discharge portion 10 has a paper discharge tray 10b. The paper discharge tray 10b is capable of supporting a plurality of sheets of the printing paper P1 in a stacked state. A paper discharge opening 10a is formed in the front surface of the housing 2. In the present embodiment, the paper discharge opening 10a and the opening 2a are a common part. The printing paper P1 placed in the paper discharge tray 10b is removed from the paper discharge opening 10a.

Figure 3:
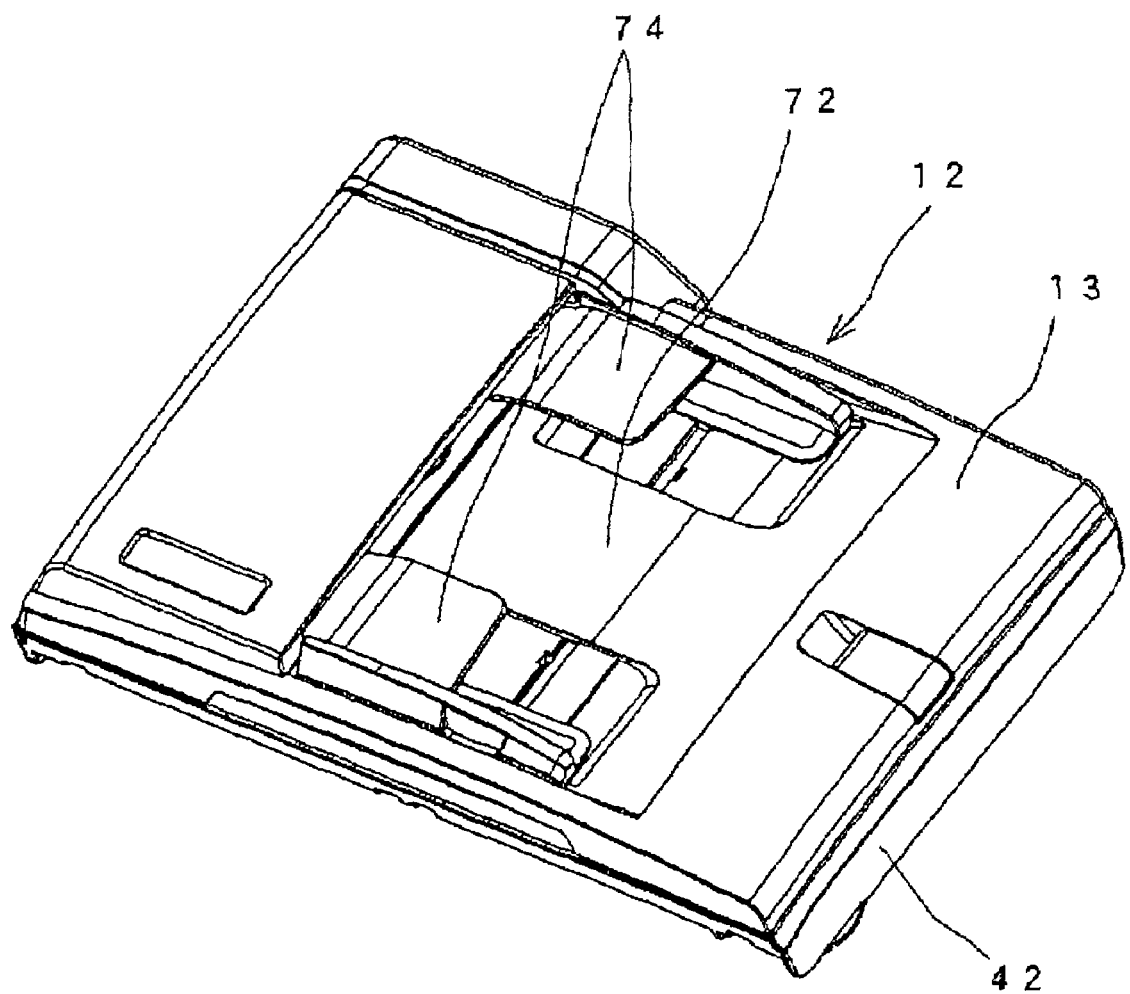
FIG. 3 shows a perspective view of a scanner.
Figure 5:
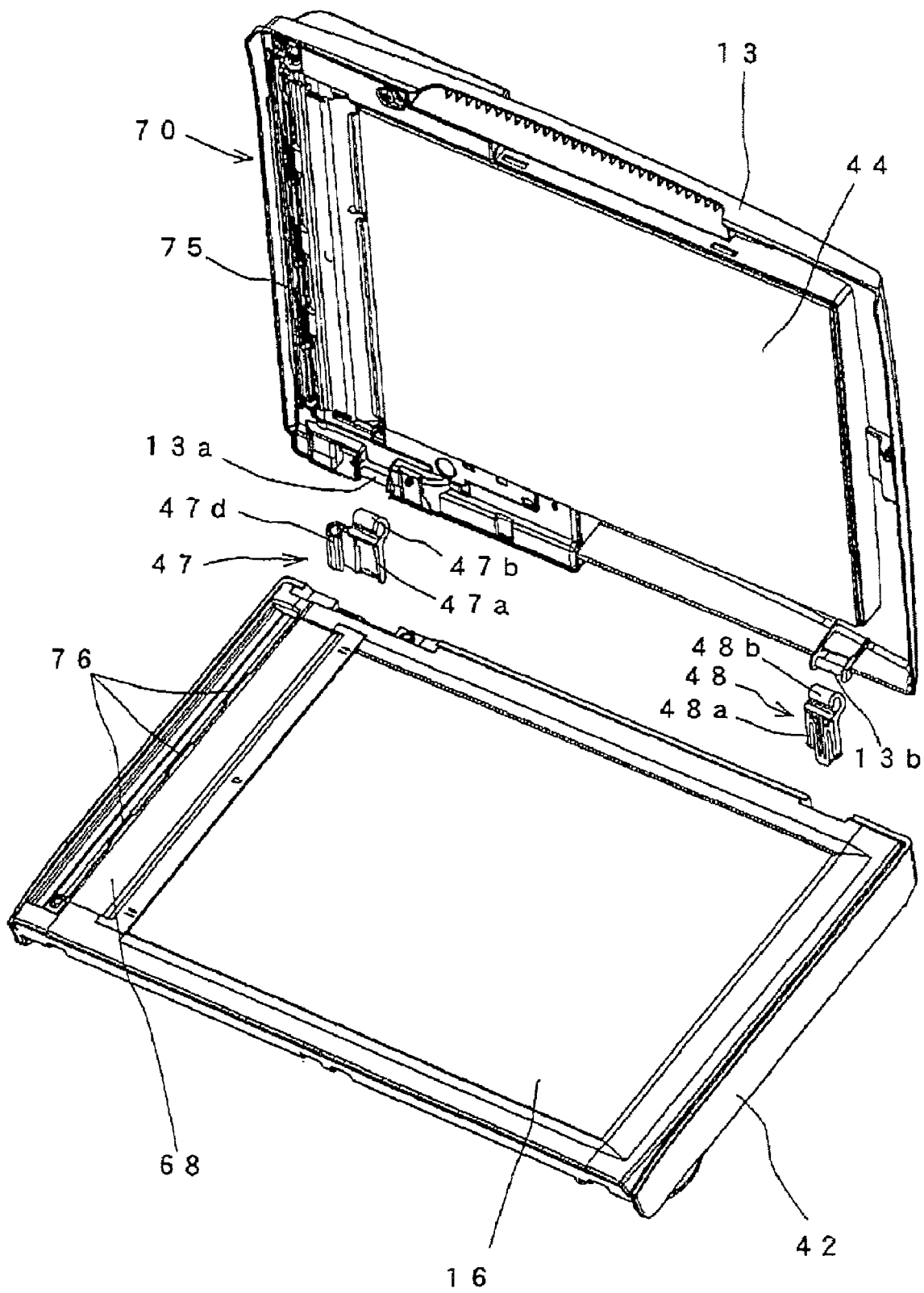
FIG. 5 shows an exploded perspective view of the scanner.
Figure 6:
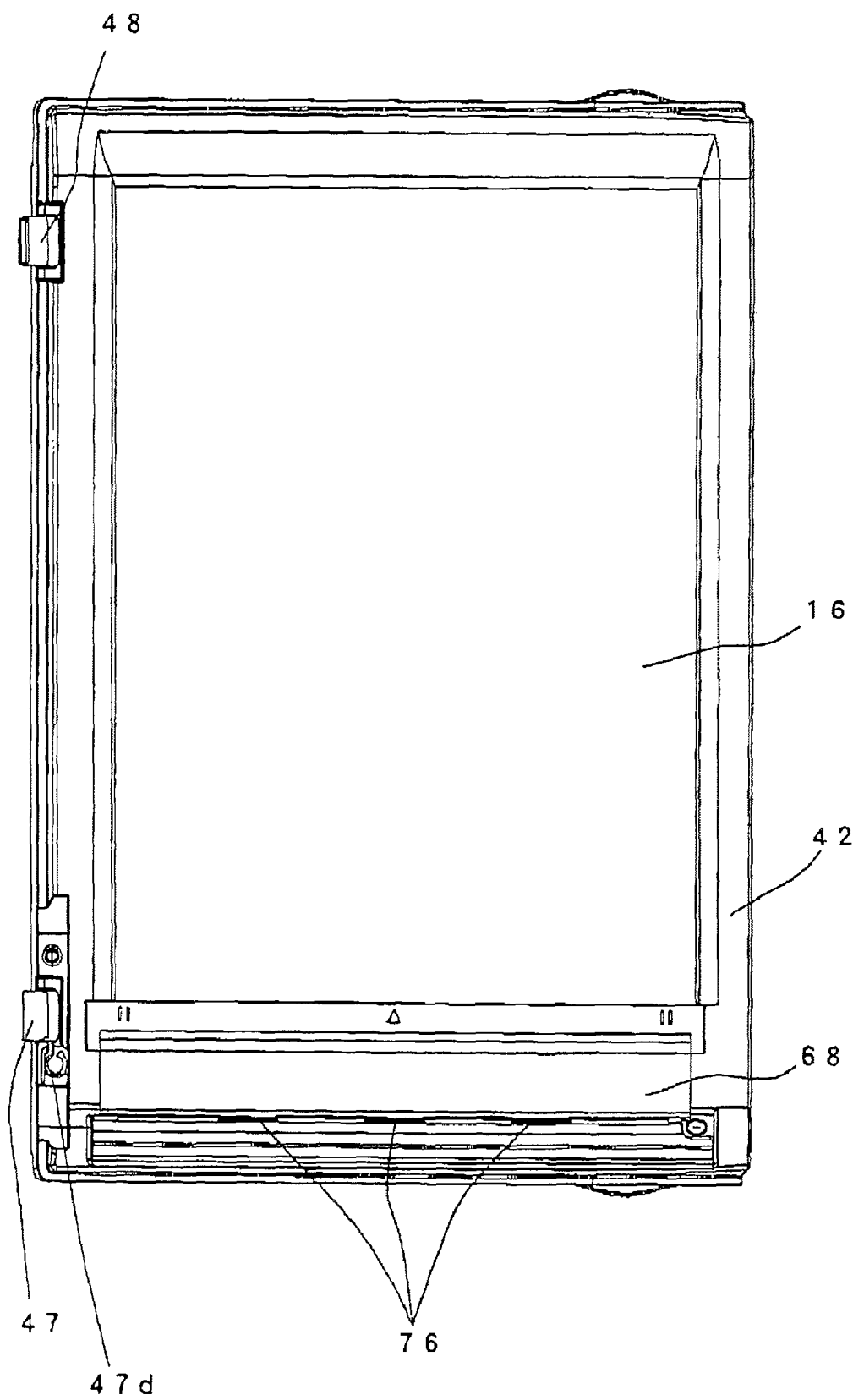
FIG. 6 shows a plan view of the scanner in a state where the document cover has been removed.

FIG. 3 shows a perspective view of only the scanner 12. FIG. 4 shows a perspective view of the scanner 12 in a state where the document cover 13 is open. FIG. 5 shows an exploded perspective view of the scanner 12. FIG. 6 shows a plan view of the scanner 12 in a state where the document cover 13 has been removed.

The scanner 12 has both a flat bed mechanism for scanning an image from a document placed on the first document glass 16, and an auto feeding mechanism for automatically feeding a document and scanning an image from this document.

As shown in FIGS. 3 and 4, the scanner 12 comprises the device main body 42. The device main body 42 has a rectangular box shape. The device main body 42 is formed from resin. The first document glass 16 and the second document glass 68 form the top surface of the device main body 42. A document is placed on the first document glass 16. The region on which the document is placed on the first document glass 16 is formed in a substantially rectangular shape. A sponge 44 is attached to an inner surface of the document cover 13. The sponge 44 has a rectangular shape. When the document cover 13 has been closed, the sponge 44 is capable of covering the region on which the document is placed of the first document glass 16. The sponge 44 is capable of pressing the document placed on the first document glass 16. Although this is not shown, a surface of the sponge 44 is covered by a white resin film.

The second document glass 68 is disposed to the left of the first document glass 16. The second document glass 68 is smaller in width in the left-right direction than the first document glass 16. The second document glass 68 has a rectangular shape wherein the long sides thereof extend in the front-rear direction. The first document glass 16 and the second document glass 68 are disposed on the same plane.

The CIS 17 is disposed below the second document class 68. The CIS 17 is capable of moving in the left-right direction along the guide shaft 38 (see FIG. 2). That is, the CIS 17 is capable of moving from the position below the second document glass 68 along the first document glass 16 below this first document glass 16.

An auto document feeder 70 is formed in the document cover 13. As shown in FIG. 3, the auto document feeder 70 comprises a document feeder tray 72 and a document discharge tray 74. The document feeder tray 72 and the document discharge tray 74 are formed on a top surface of the document cover 13. As shown in FIG. 4, the auto document feeder 70 comprises a transporting roller 75. When the document cover 13 is in the closed state, a rotary shaft of the transporting roller 75 extends in the front-rear direction. That is, the rotary shaft of the transporting roller 75 is orthogonal to the document transporting direction. When the transporting roller 75, etc. rotates, the document placed on the document feeder tray 72 passes above the second document glass 68.

A front end of the document that has passed over the second document glass 68 is raised by a plurality of protrusions 76 (see FIG. 4) formed on the device main body 42. As a result, the document is led to the side of the document cover 13 (the upper side) and is transported to the document discharge tray 74.

In the case where the document is scanned using the auto document feeder 70, the CIS 17 below the second document glass 68 is halted The document placed in the document feeder tray 72 passes over the second document glass 68 and is transported to the document discharge tray 74. The CIS 17 is capable of scanning an image from the document passing over the second document glass 68.

As shown in FIGS. 4 to 6, the scanner 12 has a pair of hinges 47 and 48. The hinges 47 and 48 are disposed between a rear end of the document cover 13 and a rear end of the device main body 42. The hinge 47 at the left has a sliding portion 47a, an opening-closing supporting portion 47b, and a supporting portion 47d. The portions 47a, 47b, and 47d are formed integrally. The hinge 48 at the right has a sliding portion 48a and an opening-closing supporting portion 48b. The portions 48a and 48b are formed integrally. The hinge 48 does not have a portion equivalent to the supporting portion 47d of the hinge 47.

Figure 7:
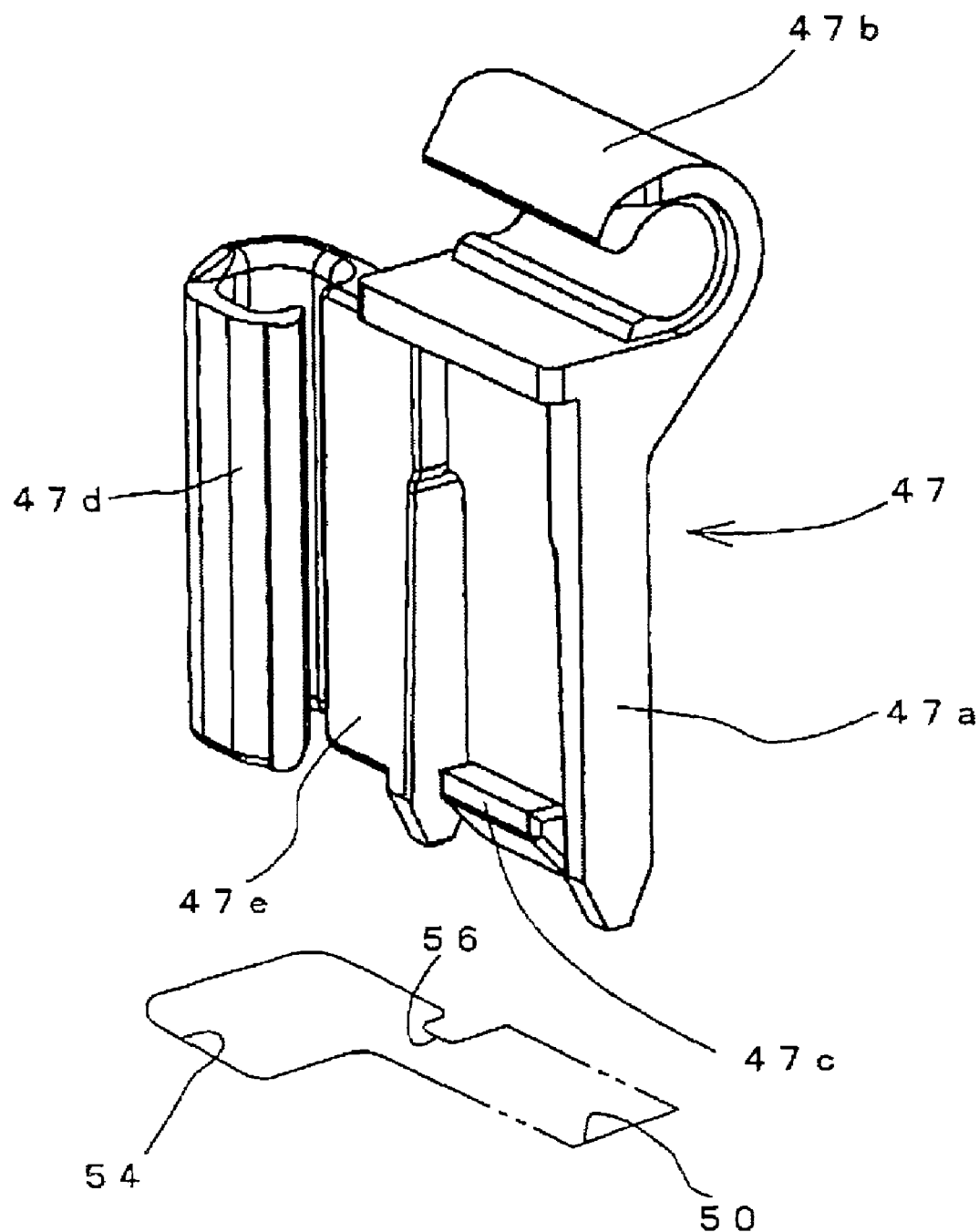
FIG. 7 shows a perspective view of a left hinge.
Figure 8:
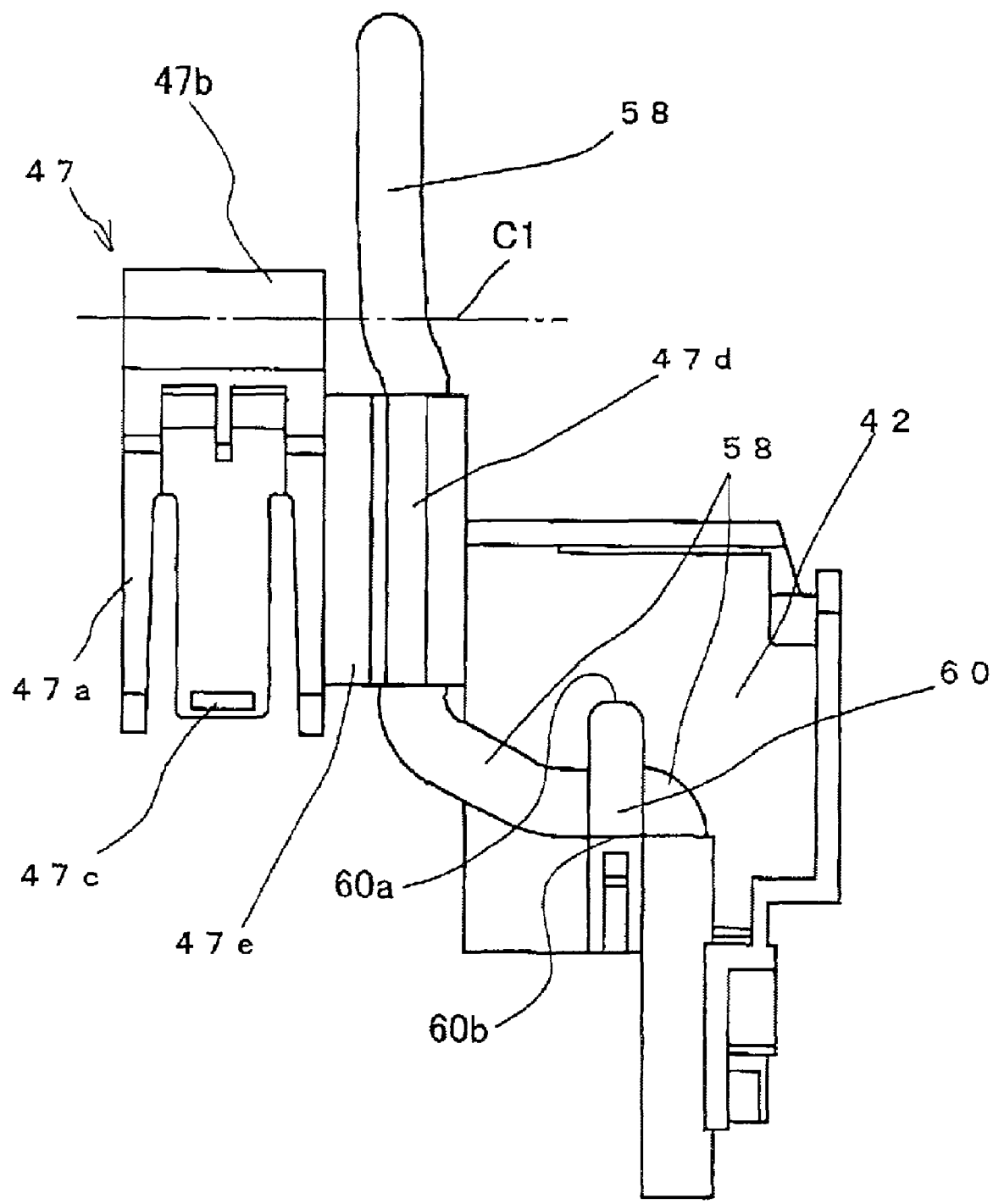
FIG. 8 shows the left hinge and surrounding members thereof in a state where the document cover is in a raised position.
Figure 9:
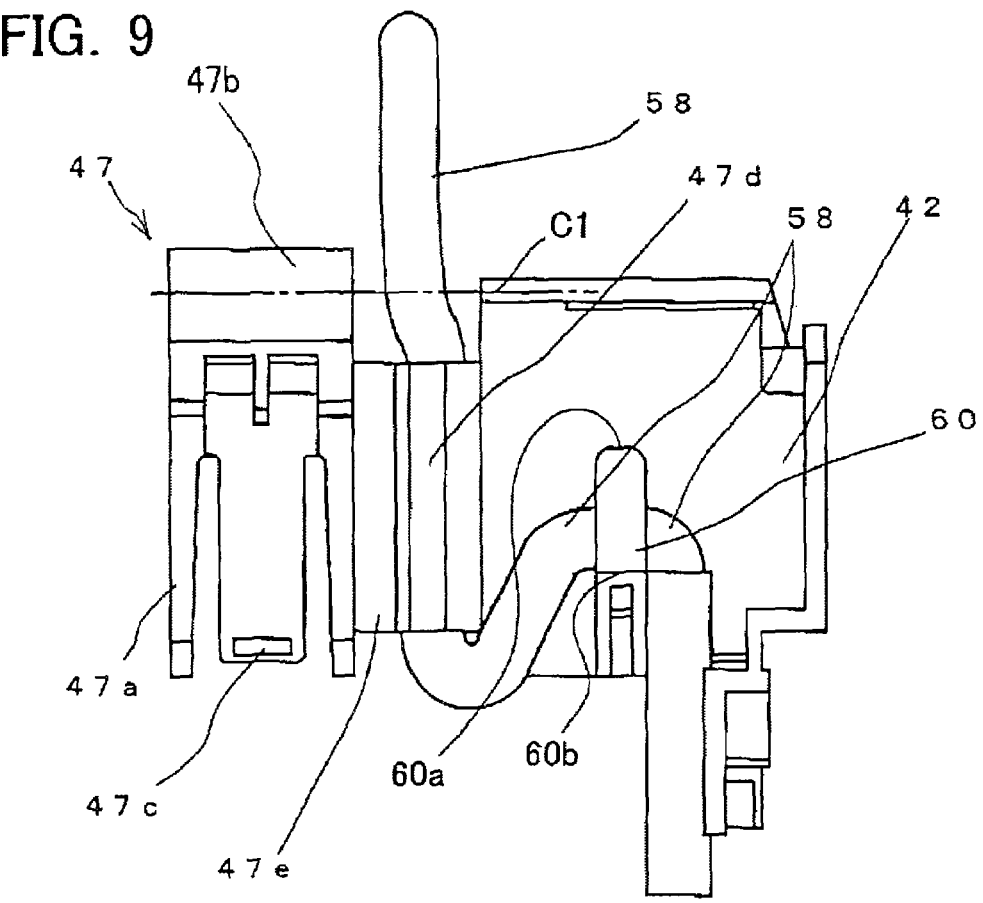
FIG. 9 shows the left hinge and the surrounding members thereof in a state where the document cover is in a lowered position.

FIG. 7 shows a perspective view of the left hinge 47. FIG. 8 shows the device main body 42 and the hinge 47 from the rear in the case where the document cover 13 is present at a raised end. FIG. 9 shows the device main body 42 and the hinge 47 from the rear in the case where the document cover 13 is present at a lowered end.

As shown in FIGS. 5 and 7, the sliding portion 47a of the hinge 47 extends in the up-down direction (the vertical direction). That is, the sliding portion 47a is orthogonal to the first document glass 16. As shown clearly in FIG. 8, a pair of notches extending in the up-down direction is formed in the sliding portion 47a. As a result, a hook portion 47c is formed in the sliding portion 47a. Due to its being thin, the hook portion 47c is capable of deforming resiliently. The opening-closing supporting portion 47b is disposed above the sliding portion 47a.

As shown clearly in FIG. 7, the opening-closing supporting portion 47b is open at the front and closed at the rear. That is, the opening-closing supporting portion 47b is substantially C-shaped in longitudinal cross-section. The opening-closing supporting portion 47b extends in the left-right direction. As shown in FIG. 5, a shaft portion 13a extending in the left-right direction is formed at the rear end of the document cover 13. The opening-closing supporting portion 47b supports the shaft portion 13a. The opening-closing supporting portion 47b is capable of rotating around the shaft portion 13a.

As shown in FIG. 7, a plate-shaped connecting portion 47e is disposed to the left of the sliding portion 47a. The sliding portion 47a and the connecting portion 47e are formed integrally. The supporting portion 47d is disposed to the left of the connecting portion 47e. The connecting portion 47e and the supporting portion 47d are formed integrally. The supporting portion 47d is open at the right and closed at the left. That is, the supporting portion 47d is substantially C-shaped in horizontal cross-section. The supporting portion 47d extends in the up-down direction.

A sliding hole 50 (see FIG. 7) is formed in the top surface of the device main body 42. The sliding hole 50 extends in the up-down direction. When the device main body 42 is viewed from a plan view, the sliding hole 50 has a substantially rectangular shape. The sliding portion 47a of the hinge 47 is inserted into the sliding hole 50. In the present embodiment, the length in the up-down direction of the sliding hole 50 is shorter than the length in the up-down direction of the sliding portion 47a. The sliding portion 47a is capable of sliding in the up-down direction along the sliding hole 50. The entirety of the hinge 47 can slide in the up-down direction along the sliding hole 50. When the hinge 47 is raised, the hook portion 47c makes contact with the device main body 42. The hinge 47 is thus prevented from rising any higher. Further, when the hinge 47 is lowered, the opening-closing supporting portion 47b makes contact with the device main body 42. The hinge 47 is thus prevented from descending any lower.

A housing hole 54 and a connecting hole 56 are formed in the top surface of the device main body 42. The sliding hole 50 and the housing hole 54 are linked by the connecting hole 56. The supporting portion 47d of the hinge 47 is inserted into the housing hole 54. The supporting portion 47d is capable of sliding in the up-down direction along the housing hole 54. Further, the connecting portion 47e is inserted into the connecting hole 56. The connecting portion 47e is capable of sliding in the up-down direction along the connecting hole 56.

A controller (not shown) for controlling the auto document feeder 70 (for example, the transporting roller 75) is disposed within the device main body 42. The auto document feeder 70 and the controller are connected by an electric wiring. As shown in FIGS. 8 and 9, a wiring 58 extends along the supporting portion 47d. The wiring 58 is positioned within a substantially C-shaped hole in the supporting portion 47d. That is, the wiring 58 can be said to be supported by the supporting portion 47d. The wiring 58 is, for example, a group of electric power wirings or signal wirings. The wiring 58 can be inserted into the C-shaped hole from the C-shaped opening of the supporting portion 47d. The wiring 58 is thus supported by the supporting portion 47d. The wiring 58 can thus easily be attached to the supporting portion 47d even when a connector (not shown) is attached to a front tip of the wiring 58.

The device main body 42 comprises a main body side support portion 60. The main body side support portion 60 is located in a position slightly removed from the supporting portion 47d of the hinge 47. The wiring 58 that extends past the supporting portion 47d of the hinge 47 toward the device main body 42 is supported by the main body side support portion 60. The part of the wiring 58 supported by the main body side support portion 60 extends in the direction (the horizontal direction) in which the shaft portion 13a (see FIG. 5) of the document cover 13 extends. That is, the part of the wiring 58 supported by the supporting portion 47d of the hinge 47 is orthogonal to the part of the wiring 58 supported by the main body side support portion 60 of the device main body 42.

Further, as shown in FIG. 8, a bottom end of the supporting portion 47d of the hinge 47 that has been raised is positioned above a top end 60a of the main body side support portion 60. As shown in FIG. 9, the bottom end of the supporting portion 47d of the hinge 47 that has been lowered is positioned below a bottom end 60b of the main body side support portion 60. That is, the main body side support portion 60 is disposed between the sliding width of the bottom end of the supporting portion 47d of the hinge 47.

As described above, the wiring 58 is supported by both the main body side support portion 60 of the device main body 42, and by the supporting portion 47d of the hinge 47. The wiring 58 that is present above the supporting portion 47d of the hinge 47 intercepts a rotational center C1 of the shaft portion 13a of the document cover 13 and extends thereabove. The wiring 58 that is present above the rotational center C1 is housed within the document cover 13, and is fixed to the document cover 13.

Figure 10:
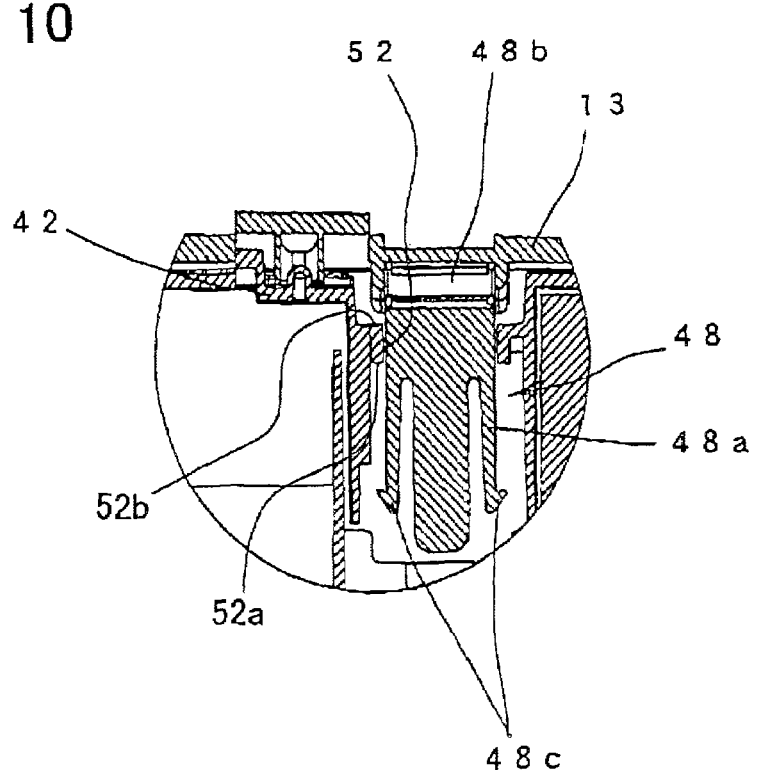
FIG. 10 shows a cross-sectional view of a right hinge and surrounding members thereof.

Next, the configuration of the right hinge 48 will be described. FIG. 10 shows a cross-sectional view of the hinge 48 and the surroundings thereof. A sliding hole 52 is formed in the device main body 42. When the device main body 42 is viewed from a plan view, the sliding hole 52 has a substantially rectangular shape. The sliding portion 48a of the hinge 48 is inserted into the sliding hole 52. A pair of notches extending in the up-down direction is formed in the sliding portion 48a. As a result, a pair of hook parts 48c is formed in the sliding portion 48a. Due to being thin, the pair of hook parts 48c is capable deforming resiliently. The right hook portion 48c protrudes to the right from the sliding hole 52. The left hook portion 48c protrudes to the left from the sliding hole 52. The right hook portion 48c deforms resiliently toward the left, and the left hook portion 48c deforms resiliently toward the right. The sliding portion 48a can thus be inserted into the sliding hole 52.

The sliding hole 52 extends in the up-down direction. The length in the up-down direction of the sliding hole 52 is shorter than the length in the up-down direction of the sliding portion 48a. The sliding portion 48a is capable of sliding in the up-down direction along the sliding hole 52. That is, the entirety of the hinge 48 can slide in the up-down direction along the sliding hole 52. When the hinge 48 is raised, the hook parts 48c make contact with a bottom end 52a of the sliding hole 52. The hinge 48 is thus prevented from rising any higher. Further, when the hinge 48 is lowered the opening-closing supporting portion 48b makes contact with a top end 52b of the sliding hole 52. The hinge 48 is thus prevented from descending any lower.

The opening-closing, supporting portion 48b has substantially the same shape as the opening-closing supporting portion 47b of the hinge 47. That is, the opening-closing supporting portion 48b is substantially C-shaped in longitudinal cross-section. As shown in FIG. 5, a shaft portion 13b extending in the left-right direction is formed at the rear end of the document cover 13. The opening-closing supporting portion 48b supports the shaft portion 13b. The opening-closing supporting portion 48b is capable of rotating around the shaft portion 13b.

Next, the operation of the scanner 12 will be described. First, in the case where a thin document is to be scanned (when for example the document to be scanned is a single A4 sheet), the pair of hinges 47 and 48 is slid downward. The hinges 47 and 48 (the document cover 13) are thus positioned in a lowered position. In this case, as shown in FIG. 9, the bottom end of the supporting portion 47d of the left hinge 47 is positioned below the bottom end 60b of the main body side support portion 60 of the device main body 42.

Next, the document cover 13 is rotated around the shaft members 13a and 13b, and the document cover 13 is opened. That is, the document cover 13 assumes the state shown in FIG. 4. Then the document is placed on the first document glass 16. Next, the document cover 13 is rotated around the shaft members 13a and 13b, and the document cover 13 is closed.

As described above, the wiring 58 is disposed so as to intercept the rotational center C1 of the document cover 13. As a result, the wiring 58 bends around the rotational center C1 when the document cover 13 is opened and closed. The wiring 58 does not form an obstruction when the document cover 13 is opened and closed. The document cover 13 can be opened and closed smoothly.

In the case where the document to be scanned is thick (a book for example), the document cover 13 is raised in accordance with the thickness of the document placed on the first document glass 16. The sliding parts 47a and 48a of the hinges 47 and 48 thus slide upward along the sliding holes 50 and 52 of the device main body 42. A space between the document cover 13 and the first document glass 16 can be increased while maintaining the document cover 13 and the first document glass 16 in a parallel state. A thick document such as book can thus be covered by the document cover 13.

In the case where the hinge 47 is raised from the lowered position (see FIG. 9) to a raised position (see FIG. 8), the wiring 58 is raised by the supporting portion 47d of the left hinge 47. Since the part of the wiring 58 supported by the main body side support portion 60 of the device main body 42 does not move, the part of the wiring 58 located between the main body side support portion 60 of the device main body 42 and the supporting portion 47d of the hinge 47 bends.

As described above, the main body side support portion 60 is disposed within the sliding width of the bottom end of the supporting portion 47d of the hinge 47. Further, the main body side support portion 60 maintains the wiring 58 in a horizontal direction. As a result, the wiring 58 can easily bend when raised by the supporting portion 47d of the hinge 47.

When the document cover 13 is slid upward or downward, the part of the wiring 58 located between the main body side support portion 60 and the supporting portion 47d bends. As a result, the wiring 58 is prevented from interfering with the sliding of the document cover 13. Moreover, the main body side support portion 60 and the supporting portion 47d can be disposed so as to be adjacent such that their positions accord with the bending of the wiring 58. In this case, the wiring 58 does not need to bend by a large amount.

In the case where the document cover 13 is rotated around the shaft members 13a and 13b of the document cover 13, the part of the wiring 58 between the supporting portion 47d and the document cover 13 bends. As a result, the wiring 58 is prevented from interfering with the rotation of the document cover 13.

In the present embodiment, the wiring 58 between the device main body 42 and the document cover 13 is supported by the hinge 47. A covering body for covering the wiring 58 is not required. The wiring 58 can thus be supported without increasing the number of parts forming the scanner 12. It is possible to prevent the wiring 58 from being gripped between the device main body 42 and the document cover 13. Further, since a covering body is nor required, the scanner 12 can be made smaller.

After the document cover 13 has been closed, a user operates the keys of the operation panel portion 14 (see FIG. 1), to instruct the scanning operation. The CIS 17 thus moves along the guide shaft 38 below the first document glass 16, and scans the image from the document.

In the case where the document scanned by the CIS 17 is to be copied, the printing paper P1 is transported from the feeder cassette 3. The printing paper P1 is printed by the recording portion 7. The recording portion 7 discharges ink from the recording head 4 in accordance with image data of the document that was scanned, and prints the image on the printing paper P1. The printing paper P1 printed by the recording portion 7 is transported to the paper discharge portion 10.

Further, in the case where the auto document feeder 70 is utilized, the document cover 13 is put into the closed state. The document is placed on the document feeder tray 72. The transporting roller 75, etc. of the auto document feeder 70 is rotated, and the document placed on the document feeder tray 72 passes above the second document glass 68. The front end of the document that has passed over the second document glass 68 is raised by the protrusions 76 (see FIG. 4), and is transported to the document discharge tray 74. The CIS 17 is halted below the second document glass 68, and the CIS 17 scans the image from the document passing over the second document glass 68.

An embodiment of the present invention has been described in detail. However, the present invention is not restricted to the above embodiment, but can also be embodied in various ways within a range that does not deviate from the substance thereof.

What is claimed is:

1. A scanner, comprising:
a device main body comprising a transparent plate, the transparent plate forming a top surface of the device main body;
a hinge coupled to the device main body;
a cover member coupled to the hinge, the cover member being capable of rotating with respect to the device main body and covering the transparent plate, the cover member comprising an auto document feeder; and
a scanning device located below the transparent plate, the scanning device being capable of scanning a document put on the transparent plate or a document fed by the auto document feeder,
wherein the hinge comprises a wiring support portion that supports a wiring extending between the auto document feeder and the device main body, and
the wiring intercepts a rotational central line of the cover member.

2. The scanner as in claim 1, wherein
the cover member is capable of moving in a vertical direction with respect to the device main body.

3. The scanner as in claim 2, wherein
the hinge is capable of sliding in the vertical direction with respect to the device main body, and
in a case where the hinge slides in the vertical direction with respect to the device main body, the cover member moves in the vertical direction with respect to the device main body.

4. The scanner as in claim 3, wherein
the device main body comprises a hole extending in the vertical direction,
a part of the hinge is located within the hole, and
the hinge is capable of sliding in the vertical direction along the hole.

5. The scanner as in claim 4, wherein
a part of the wiring support portion is located within the hole.

6. The scanner as in claim 1, wherein
the wiring support portion of the hinge supports a part of the wiring, and this part extends in the vertical direction.

7. The scanner as in claim 1, wherein
the cover member comprises a shaft extending in a horizontal direction,
the hinge comprises a shaft support portion that supports the shaft, and
the cover member is capable of rotating with the shaft as a center.

8. The scanner as in claim 1, wherein
the device main body comprises a main body side support portion that supports the wiring.

9. The scanner as in claim 8, wherein
the wiring support portion of the hinge supports a part of the wiring, and this part extends in the vertical direction, and
the main body side support portion supports a part of the wiring, and this part extends in a horizontal direction.

10. The scanner as in claim 1, wherein
the hinge further comprises:
a sliding portion inserted into a hole formed in the device main body, wherein the hole extends in a vertical direction with respect to the transparent plate; and
a shaft support portion that supports a shaft formed on the cover member, wherein the shaft extends in a horizontal direction, and the shaft support portion is coupled to the sliding portion, the shaft support portion is above the sliding portion, wherein the wiring support portion of the hinge aligns with the sliding portion in the horizontal direction.

11. The scanner as in claim 10, wherein
the wiring support portion of the hinge supports a part of the wiring extending in the vertical direction, and
the device main body further comprises a main body side support portion that supports a part of the wiring extending in the horizontal direction.

12. The scanner as in claim 10, wherein
the sliding portion of the hinge comprises a hook part,
in a case where the hinge slides upward, the hook part makes contact with a surface forming the hole of the device main body, and
the hinge is prevented from sliding upward beyond a position where the hook part makes contact with the surface.

13. The scanner as in claim 11, wherein
the hinge is configured to slide between an upper position and a lower position, and
a top end of the main body side support portion is located between a bottom end of the wiring support portion of the hinge when the hinge is located at the upper position and the bottom end of the wiring support portion of the hinge when the hinge is located at the lower position.

* * * * *